(12) United States Patent
Dufresne et al.

(10) Patent No.: US 10,195,601 B2
(45) Date of Patent: Feb. 5, 2019

(54) PROCESS FOR LIMITING SELF HEATING OF ACTIVATED CATALYSTS

(71) Applicant: Eurecat S.A, La Voulte-sur-Rhône (FR)

(72) Inventors: Pierre Dufresne, Aouste sur Sye (FR); Pauline Galliou, Saint Laurent du Pape (FR); Mathieu Baffert, Guilherand Granges (FR); Sharath Kirumakki, Friendswood, TX (US)

(73) Assignee: Eurecat S. A., La Voulte-sur-Rhone (FR)

( * ) Notice: Subject to any disclaimer, the term of this patent is extended or adjusted under 35 U.S.C. 154(b) by 0 days.

(21) Appl. No.: 14/790,262

(22) Filed: Jul. 2, 2015

(65) Prior Publication Data

US 2016/0001279 A1    Jan. 7, 2016

(30) Foreign Application Priority Data

Jul. 3, 2014 (FR) .................... 14 56359

(51) Int. Cl.
| | | |
|---|---|---|
| *B01J 37/02* | (2006.01) | |
| *B01J 33/00* | (2006.01) | |
| *B01J 23/882* | (2006.01) | |
| *B01J 23/883* | (2006.01) | |
| *B01J 23/888* | (2006.01) | |
| *B01J 23/00* | (2006.01) | |
| *B01J 31/06* | (2006.01) | |
| *B01J 31/34* | (2006.01) | |
| *B01J 35/00* | (2006.01) | |
| *C10G 45/04* | (2006.01) | |

(52) U.S. Cl.
CPC ............ *B01J 33/00* (2013.01); *B01J 23/002* (2013.01); *B01J 23/882* (2013.01); *B01J 23/883* (2013.01); *B01J 23/8885* (2013.01); *B01J 31/06* (2013.01); *B01J 31/34* (2013.01); *B01J 35/0006* (2013.01); *B01J 37/0219* (2013.01); *B01J 37/0221* (2013.01); *B01J 37/0232* (2013.01); *C10G 45/04* (2013.01); *B01J 2523/00* (2013.01)

(58) Field of Classification Search
CPC ...... B01J 23/002; B01J 23/882; B01J 23/883; B01J 23/8885; B01J 2523/00; B01J 31/06; B01J 31/34; B01J 33/00; B01J 35/0006; B01J 35/002; B01J 37/0219; B01J 37/0221; B01J 37/0232; C10G 45/08

USPC ......................................................... 502/159
See application file for complete search history.

(56) References Cited

U.S. PATENT DOCUMENTS

| | | | |
|---|---|---|---|
| 3,253,944 A | 5/1966 | Wurster | |
| 4,363,285 A * | 12/1982 | Yoshida | ................... A23G 3/26 118/19 |
| 4,956,322 A * | 9/1990 | Gouzard | ................... B01J 33/00 502/10 |
| 6,294,498 B1 * | 9/2001 | Darcissac | .............. B01J 23/882 502/159 |
| 7,566,369 B2 * | 7/2009 | Wittebrood | ............. B24B 31/00 134/10 |
| 2001/0055648 A1 | 12/2001 | Lee et al. | |

FOREIGN PATENT DOCUMENTS

| | | |
|---|---|---|
| CN | 101422727 A | 5/2009 |
| EP | 0311508 A1 | 4/1989 |
| EP | 0897748 A1 | 2/1999 |
| EP | 2781262 A1 | 9/2014 |
| WO | 2011113918 A1 | 9/2011 |

OTHER PUBLICATIONS

Kleinbach et al. "Coating of solids". Chemical Engineering and Processing 34 (1995) 329-337.*
Preliminary Search Report dated Mar. 23, 2015 for French Application No. 1456359.

* cited by examiner

*Primary Examiner* — Alexander M Weddle
(74) *Attorney, Agent, or Firm* — Saul Ewing Arnstein & Lehr LLP; Peter C. Lauro, Esq.

(57) ABSTRACT

The invention provides a process for limiting self heating of activated particle catalysts wherein the catalyst particles are placed in motion inside a hot gas flow that passes through them and a liquid composition containing one or several film forming polymer(s) is pulverized onto the particles in motion until a protective layer is obtained on the surface of said particles containing said film forming polymer and having an average thickness of less than or equal to 20 μm. The invention also provides the use of this process to reduce the quantities of toxic gases that may be emitted by the activated catalysts, as well as an activated catalyst for the hydroconversion of hydrocarbons covered with a continuous protective layer that are obtained by this process.

18 Claims, No Drawings

PROCESS FOR LIMITING SELF HEATING OF ACTIVATED CATALYSTS

This application claims priority to French Application No. 1456359, filed on Jul. 3, 2014, the entire content of which is incorporated herein by reference.

This invention concerns a process for limiting self heating of activated catalysts, such as during their storage, handling and transportation.

According to the invention, the process also permits limiting toxic gases that may be released by these catalysts.

The purpose of this invention is also a coated activated hydroconversion catalyst, obtained by the process described above.

Catalysts that can be treated by the process according to the invention are for instance, without being limited thereto, those used in the hydrocarbon treatment processes, in particular in the areas of oil refining and petrochemistry, and more in particular, in the hydroconversion processes of hydrocarbons.

The hydrocarbon treatment processes conducted in refineries and/or petrochemical units include a certain number of treatments possibly made in the presence of hydrogen which are aimed at modifying the structure of the hydrocarbon molecules and/or to eliminate hydrocarbonated cuts from undesirable compounds such as sulfur, nitrogen, aromatic and metal compounds. As non-limiting examples can be mentioned, hydrocracking or hydroconversion, reforming, isomerizing, alkylation, hydrogenation, dehydrogenation processes and the so-called hydrotreatment processes such as hydrodesulfurization, hydrodenitrogenation, hydrodearomatization, hydrodemetalization, hydrodeoxygenation processes.

Most of these hydrocarbon treatment processes call upon solid particle catalysts also called "catalyst grains". These catalyst particles include a porous support made of a one or two refractory inorganic oxide base onto which one or several catalytically active metals are deposited. These metals include most often one or more metals of group VIII of the periodic classification of elements, and/or one or several metals of group VIB.

Kinetics of the hydrocarbon treatment reactions is among other limited by the diffusion speed of the hydrocarbon molecules (often considerable in size) towards the catalytic sites located in the catalyst pores. That is why the manufacturers attempt to prepare the catalysts with a specific surface and a porosity that is as great as possible, which leads to small sized particle catalysts.

At the end of manufacturing the catalyst, or at the end of its regeneration in the case of a previously ready used catalyst, the active metals turn into metal oxides which are not active as such.

To enable the catalysts to be active for the various hydrocarbon treatment processes, activation of the catalyst is required, in other words, a treatment of the catalyst in order to transform the metal oxides into active metal species.

Consequently, in the case of hydrocarbon hydrotreatment catalysts, activation takes place in general by sulfuration of the catalyst, which consists of performing a treatment of the latter by means of sulfur compounds for the purpose of transforming at least partially, the metal oxides into mixed sulfurs which form the active phase of the catalyst.

This activation stage is particularly important because it conditions the activity of the catalyst during its subsequent use.

This activation of the catalysts can be done in situ (in other words, directly in the reactor where the catalyst is used, before its startup) or ex situ (in other words, outside the reactor).

In order to optimize the yield of the units, and in particular, to diminish their shutdown time during catalyst renewal operations in the reactors when the latter is used up, more and more, the catalyst activation treatments are performed ex situ.

As such, catalysts are activated in special treatment units that use sulfur compounds, then, may be stored for more or less long periods of time which may last sometimes up to a couple of months, before being transported to the reactor in which they will be loaded.

However, activated catalysts have the drawback of being particularly unstable chemically. Activated metal sites are especially sensitive, and they react in contact with air for instance. In the case of sulfur catalysts, metal sulfides present at the surface of the catalyst particles are reactive, and cause exothermic oxidation reactions that may lead to the formation of $SO_2$, which is a toxic gas.

This formation of $SO_2$ is a phenomenon that represents a risk for personnel present during loading. For instance, this gas may form in the reactor, as soon as a small part of the catalyst bed undergoes self heating. However, the tolerable exposure limit threshold over a short period of time is very low (5 ppm).

Activated catalysts are also known to result in self heating phenomena, and particularly stringent precautions must be taken during storage, transportation and handling.

The self heating properties of a material can be characterized by an international test, described by UN (test described in the "Recommendation on the transport of dangerous goods. Manual for Tests and Criteria", ISSN 1014-7160, Section 33.3) document. This test describes a procedure for measuring the degree of self heating of a sample, conducted in a 1 L box at different temperatures (100, 120 or 140° C.) to define the category in which the material will be placed. In certain cases, a procedure using a small box of 15 mL may also be used.

To prevent any risk, self heating catalysts must be kept in an inert atmosphere, for instance, using nitrogen. Loading operations of activated catalysts in the reactors take place generally with nitrogen which complicates these operations considerably and generates considerable additional expenses.

In addition, in spite of these precautions, storage, transportation and handling of activated catalysts remain particularly dangerous by reason of their self heating nature, and the risk to personnel and equipment coming into contact with these catalysts remains considerable.

Consequently, there is a need to find new solutions that permit on the one hand to reduce as much as possible the risks associated with using these activated catalysts, and on the other hand of doing away with the need to keep them in an inert atmosphere, while limiting to a high degree the potential toxic gas emissions.

For that purpose, a certain number of solutions have been proposed in the prior state of the art.

For instance, it has been proposed in the U.S. Pat. Nos. 5,681,787 and 3,453,217 to fill more or less fully the porosity of the catalyst particles, with compounds aimed at protecting actives sites, most often hydrocarbons.

However, the solutions proposed in the prior state of the art, are not fully adequate.

In particular, they do not always permit to diminish sufficiently the self heating nature of the activated catalysts, with respect to the particularly strict codes nowadays. In addition, these solutions do not provide a significant reduction of the harmful gas emissions.

Often, to effectively protect the catalyst, they require laying a relatively thick layer of protective material, which consequently reduces the density of the catalyst load in the reactor, and thus reduces the yield of the latter. Indeed, the place occupied by this layer significantly increases the actual diameter of the grain, and consequently of the volume occupied by each grain. The volume of the reactor to be loaded which is necessarily limited, is consequently, in the case of a coated catalyst, partially occupied by the protective substance, and this is all the more the case with an increased thickness of the catalyst layer. The performances of a catalyst bed are proportional to the quantity of active catalytic substance, consequently they may be significantly diminished if the coating layer is too thick, which cannot be tolerated. In addition, during the elimination of the protective material layer, the volume occupied by the latter is freed up. If this occupied volume is considerable, the catalyst bed will be modified, which may generate preferential ways to the feedstock circulating through the bed, which is contrary to the requirements of a perfect distribution of the feedstock throughout the catalyst bed in the reactor, and becomes particularly harmful for the performance ratings of the unit.

This invention aims at proposing a method that permits on the one hand to limit efficiently the self heating phenomena of the activated catalysts, and on the other hand, to eliminate the drawbacks of the methods of the prior state of the art.

The Applicant has found out unexpectedly that this goal was met with a process in which the activated catalyst particles are covered with a very thin protective layer of film forming polymer using a particular process in which the particles are kept moving within a hot gas flow while a liquid composition containing the film forming polymer is pulverized over said particles.

Preferably, the pulverization takes place using an atomization nozzle in which the liquid composition is mixed with a gas under pressure, preferably compressed air, which permits obtaining very fine drops.

The purpose of the process according to the invention is to create a continuous layer of a protective material on the external surface of the catalyst grains. The basic principle that consists in protecting a catalyst by a protective material has already been described in the prior state of the art, but obtaining a catalyst that meets the requirements described above is very complex. The Applicant has discovered that in order to meet all these requirements efficiently, particular film forming polymer based protective materials should be associated with a high precision coating process.

Consequently, the purpose of this invention is a process to limit the self heating of activated particle catalysts, in which catalyst particles are placed in motion within a hot gas flow that passes through them, and a liquid composition containing one or several film forming polymer(s) is pulverized over the moving particles, until on the surface of said particles, a protective layer containing said film forming polymer and having an average thickness that is lower than or equal to 20 μm is obtained.

According to this invention, the process permits to remediate the drawbacks of the processes described in the prior state of the art.

Activated catalysts traited with the process of the invention see their self heating properties diminished to a large extent.

In addition, the Applicant has observed that surprisingly, the process according to the invention permits to reduce the toxic gas emissions in a particularly effective way.

Catalysts treated with the invention process can thus be stored or transported in large quantities, for instance in bags or containers of considerable volume, and be handled (for instance, loaded into the reactors) without special precautions.

In addition, the Applicant has observed that the process according to the invention permitted to preserve a good efficiency of the units into which the activated catalyst is loaded, without any substantial loss of activity resulting from loading catalyst grains coated with a protective layer.

Finally, implementation of such a protection does not affect the activated catalyst activity, which once it does not have the protective coating anymore, keeps its full activity.

In accordance with the invention, the catalyst particles are covered with a protective layer comprising one or more film forming polymer(s).

By "polymer" is understood in the sense of the invention, compounds that include at least two repeated units, preferably at least three repeated units and more especially, at least ten repeated units.

By "film forming polymer" is meant, as already known by itself, a polymer capable of forming by itself or in the presence of an auxiliary film-forming agent, a macroscopically continuous film on a support, such as on inorganic oxide base materials such as alumina for instance.

The protective layer or coating according to the invention can include one or several film forming polymer(s) mixed with one or several other compound(s) which can be polymeric or non-polymeric. The other compounds that may be present in the protective layer according to the invention, are then introduced in a mixture with the film forming polymer(s), in the liquid composition that is pulverized on the moving particles.

The protective layer may also consist in full of one or several film forming polymers.

Preferably, the protective layer according to the invention contains from 50 to 100% by weight one or several film forming polymers. Especially preferred, the protective layer according to the invention is fully made up of one or several film forming polymers.

Preferably, the film forming polymer(s) used in this invention are selected from among:

vinyl alcohol homo- and copolymers, such as polyvinyl alcohols and copolymers made of vinyl alcohol and olefin(s) monomers such as copolymers made of ethylene and vinyl alcohol monomers (EVOH copolymers);

partially hydrolyzed vinyl alcohol homo- and copolymers, in other words, still containing non-hydrolyzed vinyl acetate units;

polyethylene glycols;

collagen;

polyethylene terephtalates (PET);

polyethylene naphtalates (PEN);

polyamides;

polysaccharides, in particular cellulose polymers and their derivatives (among which, $C_1$-$C_4$ alkyl celluloses are preferred and even more in particular, methyl celluloses) and possibly modified starches;

polyvinyl chlorides (PVC);

polyvinylidene chlorides (PVDC);

polyacrylonitrils (PAN);

polyacrylate resins, such as in particular methyl polyacrylates;

copolymers of which at least one of the monomers is of the acrylate type;

and their mixtures.

Polyvinyl alcohols and the copolymers made with vinyl alcohol and olefins monomers are especially preferred. Among the latter are preferred especially the copolymers made of vinyl alcohol and ethylene monomers also called EVOH copolymers.

According to the invention, pulverization of the liquid composition containing the film forming polymer(s) is continued until, on the surface of the particles, a protective layer is obtained with a defined average thickness (in any event, less than or equal to 20 µm), which means that when the protective layer with the desired thickness as defined below is obtained, this pulverization is stopped.

The average thickness of the protective layer according to the invention is less than or equal to 20 µm, and preferably less than or equal to 10 µm.

More preferred is that the average thickness of the protective layer ranges from 0.1 to 10 µm, even more preferred from 0.2 to 10 µm, and even better from 0.5 to 8 µm.

The average thickness of the layer or coating covering the catalyst particles may be determined by scanning electron microscopy.

According to this invention, the quantity of film forming polymer used must be adequate to permit covering the catalyst particles as completely as possible, while making sure that the protective layer remains as thin as possible.

For that purpose, the total quantity of film forming polymer used ranges advantageously from 0.1 to 6% by weight, preferably from 0.5 to 4% by weight, and even more preferred from 1 to 3% by weight, with respect to the total weight of the initial catalyst.

By total weight of the initial catalyst, one designates here the weight of the unprotected activated catalyst, in other words before covering with the protective layer according to the invention.

The film forming polymer(s) as well as the other compounds that may be present in the protective layer according to the invention are deposited on the catalyst by pulverizing a liquid composition that contains them.

According to a first embodiment, the liquid composition pulverized on the catalyst particles contains a solvent chosen among water, an organic solvent or a mixture of water and organic solvent, as well as the film forming polymer(s), dissolved or dispersed in said solvent. It may also contain, as applicable, one or several stabilizing agents.

In this case, where the liquid composition is a solution or a dispersion of film forming polymer in a solvent, said composition contains advantageously from 0.1 to 50% by weight of film forming polymer, and preferably from 0.5 to 25% by weight, and even more preferably from 1 to 10% by weight of film forming polymer, with respect to the total weight of the composition.

In the case of a dispersion of the film forming polymer(s) in a solvent, the size of the particles of dispersed polymer is advantageously less than or equal to 500 nm and preferably less than or equal to 200 nm.

According to a second embodiment, the liquid composition pulverized over the catalyst particles contains the film forming polymer(s) in the molten state. In particular, the liquid composition pulverized over the catalyst particles may be fully made up by the film forming polymer(s) in the molten state.

According to the invention, the catalyst particles are placed in motion within a hot gas flow passing through them, in other words, within a gas flow that passes through the mass of moving particles.

Any device that permits to achieve this objective can be employed for this invention.

According to a first variant, the process according to the invention can be implemented in a perforated drum in which the catalyst particles are put in motion, and the hot gas flow runs continuously through it.

According to a second variant, the process according to the invention can be implemented by placing the catalyst particles in a fluidized bed by means of the hot gas flow. In this variant, the process according to the invention can be performed in batch or continuously.

The hot gas flow passing through the catalyst particles in motion may consist of any gas or gas mixture. Preferably, it is an air flow.

By "hot" gas flow is understood a gas flow for which the temperature is higher than the ambient temperature, in other words, higher than 25° C.

Advantageously, the gas flow passing through the catalyst particles has a temperature ranging from 30 to 150° C., and preferably from 50 to 100° C.

The gas flow rate ranges advantageously from 5 to 100 m$^3$ per hour and per kilogram of catalyst.

The composition containing the film forming polymer(s) is pulverized into fine droplets, preferably continuously, onto the catalyst particles in motion.

Preferably, pulverization takes place by atomization, in other words by pulverizing the liquid composition mixed with a gas under pressure, preferably compressed air.

In general, the liquid composition is advantageously pulverized at a temperature ranging from 25 to 200° C.

In the event that the liquid composition contains the film forming polymer(s) in a dissolved or dispersed state in a solvent, said composition is preferably pulverized at a temperature ranging from 25 to 100° C.

In the event that the liquid composition contains the film forming polymer(s) in a molten state, said composition is preferably pulverized at a temperature ranging from 50 to 150° C.

In the event that the process according to the invention is performed in a perforated drum, pulverization takes place preferably on the top surface of the catalyst bed.

In the event that the process according to the invention is achieved by placing the catalyst particles in a fluidized bed, pulverization may take place either on the top surface of the catalyst bed, or directly inside the bed.

The processes described above permit the creation of a continuous protective layer on the external surface of the grains, which guarantees a maximum efficiency of the process according to the invention.

After covering the catalyst grains with a protective layer according to the invention, said grains can be dried if necessary, for instance in open air or in the presence of a gaseous air flow or of any other appropriate gas.

The process according to this invention may be applied to any solid activated catalyst that is under the form of particles, such as those used for the treatment of hydrocarbon feedstocks such as in the areas of oil refining or of petrochemistry.

By "activated catalyst" one designates in this invention catalysts containing active sites that may react spontaneously, for instance when in contact with air and/or humidity.

Active sites may be in particular metal sulfurs in the case of hydrotreatment catalysts.

The process according to the invention applies in particular to the protection of activated catalysts for hydrocarbons hydroconversion. These catalysts are under the form of particles that include a refractory oxide support on which is deposited at least a metal sulfur chosen among the metals of group VIII and the metals of group VIB of the Periodic Classification of Elements.

Preferably, the catalysts contain at least a metal of group VIII of the periodic classification of elements, such as for instance cobalt, nickel, iron, palladium, platinum. These metals may be associated with at least one metal of group VIB such as for instance molybdenum, tungsten, chrome. The content in metal or metals of group VIII falls generally between 0.1 and 20% by weight with respect to the total weight of the unprotected catalyst, sometimes up to 50%. The content in metal or metals of group VIB falls generally between 3 and 30% by weight with respect to the total weight of the catalyst (unprotected).

Preferably, the catalyst support is chosen among aluminas, silicas, amorphous or crystalized silica-aluminas (zeoliths). More preferably, the support contains at least 30% by weight, and even better at least 50% by weight, of alumina.

The process according to the invention is in particular appropriate for treating catalysts containing one of the following metal associations: CoMo, NiMo, NiW, NiCoMo, deposited on an alumina based support.

These catalysts may contain one or several additives such as organic additives, halogen, boron, phosphorus compounds.

The catalysts targeted by the invention take on the form of particles of variable shapes, preferably spheric, cylindrical, or multi-lobe shapes and for which the maximum average dimension in number does not exceed 5 mm in general.

For catalyst particles which are cylindrical or multilobe in shape, the average diameter in number ranges generally from 0.8 to 4 mm and the average length in number ranges generally from 2.5 to 5 mm. In certain applications, spherical shaped grains are used, for which the average diameter in number varies generally from 1.5 to 5 mm.

The average dimensions in number of the catalyst grains may be determined, as is already known, by video grain size or by using a slide gauge. Typically, one may use the CAMSIZER video grain sizer, developed by the RETSCH company.

These catalysts may have a specific surface measured by the BET method, generally falling between 100 and 300 $m^2/g$, a porous volume determined by nitrogen absorption, ranging from 0.20 to 1 ml/g, and an average pores diameter determined by the nitrogen absorption ranging from 7 to 20 nm.

The process according to this invention applies to new catalysts on which an activation treatment has been done, in other words, catalysts that have never been used, as well as to activated regenerated catalysts, in other words, used catalysts which have been regenerated in order to remove their hydrocarbon residue (coke) and to restore a level of activity enabling their reuse and which have subsequently being activated during a successive stage.

It must be pointed out that even if in this specification the process according to the invention is described with respect to specific catalysts used in hydrocarbon treatment processes, it may be implemented to protect any solid particle catalyst, having at its surface active sites which are particularly fragile and/or reactive and/or susceptible of producing toxic gases.

Deprotection of the catalyst particles takes place preferably once they have been loaded in the reactor in which they are being used.

It is done by placing the catalyst under conditions in which the material layer present at the surface of the particles, is eliminated.

In an especially preferred way, the film forming polymer(s) used in this invention is/are chosen so that it/they are eliminated spontaneously when coming in contact with the feedstock during startup of the reactor in which the catalyst is used. This embodiment enables to remove very simply and economically, the protective layer covering the catalyst at the time of starting up the reactor.

The film forming polymer(s) are thus preferably chosen among polymers that decompose or which are washed by the feedstock at temperatures between ambient temperature and the operating temperature of the reactor, in other words, at a temperature between 25° C. and 400° C., and at a pressure between atmospheric pressure and 20 MPa.

In a more preferred way, the film forming polymer(s) are chosen among the compounds that decompose or are washed by the feedstock at a temperature ranging from 50° C. to 400° C., preferably from 100 to 300° C. and at a pressure ranging from 0.1 to 10 MPa.

By feedstock is meant, in the case of hydrocarbon treatment catalysts, the hydrocarbon cuts having typically a boiling range at atmospheric pressure falling within a range of 75 to 650° C. and that may be put in contact with the catalyst in the liquid or gaseous state.

The purpose of this invention is also the use of the process as described above, to reduce the quantities of toxic gases that may be emitted by the activated catalysts.

Finally, the purpose of this invention is an activated hydroconversion catalyst of hydrocarbons in the form of particles covered with a continuous protective layer, that may be obtained by the process described above.

This catalyst is made up of activated catalytic particles (in other words, comprising active sites) and which are each covered at their surface by a continuous protective layer having an average thickness of 0.1 to 20 µm, and comprising from 50 to 100% by weight one or several film forming polymer(s) selected among:
- vinyl alcohol homo- and copolymers, such as polyvinyl alcohols and copolymers made from vinyl alcohol and olefin(s) monomers such as copolymers made from ethylene and vinyl alcohol monomers (EVOH copolymers);
- partially hydrolyzed vinyl alcohol homo- and copolymers, in other words, still containing non-hydrolyzed vinyl acetate units;
- polyethylene glycols;
- collagen;
- polyethylene terephtalates (PET);
- polyethylene naphtalates (PEN);
- polyamides;
- polysaccharides, in particular cellulose polymers and their derivatives (among which, one prefers in particular C1-C4 alkyl-celluloses and even more preferably methyl celluloses) and possibly modified starches;
- polyvinyl chlorides (PVC);
- polyvinylidene chlorides (PVDC);
- polyacrylonitrils (PAN);
- polyacrylate resins, such as in particular methyl polyacrylates;
- copolymers of which at least one of the monomers is of the acrylate type;
- and their mixtures.

By "continuous" layer is meant a layer such that each catalyst grain is fully coated or covered by said layer. The thickness of the layer may be variable between different grains or at the surface of one and the same grain, but it is never equal to zero at any point of each catalyst grain, and preferably it is never locally (in other words, at any point) less than 30% of the average thickness of the layer.

As stated above, the protective layer is preferably made up entirely by one or several film forming polymer(s).

Polyvinyl alcohols and copolymers made of vinyl alcohol and olefin(s) monomers are especially preferred. Among the latter, especially copolymers made up of ethylene and vinyl alcohol monomers or EVOH copolymers are preferred.

As stated above, the average thickness of the protective layer according to the invention ranges preferably from 0.1 to 10 µm. More preferably, the average thickness of the protective layer ranges from 0.2 to 10 µm, and even better from 0.5 to 8 µm.

The total amount of film forming polymer covering the activated hydroconversion catalyst according to the invention represents from 0.1 to 4% by weight, preferably from 0.5 to 4% by weight, and in an even more preferred way from 1 to 3% by weight, with respect to the total weight of the initial catalyst (in other words, with respect to the unprotected activated catalyst, before being covered by the protective layer according to the invention).

Needless to say, all what has been described above concerning the protection process also applies to the catalyst protected according to the invention.

The examples that follow are given as mere illustrations of this invention.

EXAMPLES

The examples below have been carried out using a commercial regenerated hydrotreatment catalyst, that contains 20% by weight of $MoO_3$, and 5% by weight of CoO on alumina support, and which is made of cylindrical shaped extruded particles with an average diameter in number of 1.3 mm and an average length in number of 3.2 mm.

Activation of the Catalyst:

this catalyst has been introduced in a rotating oven fed with a gaseous sulfo-reduction mixture of hydrogen and hydrogen sulfide at partial pressures respectively of $0.8 \cdot 10^5$ and $0.2 \cdot 10^5$ Pa, with the gas and the solid circulating in counter-current flow. Sulfuration of the solid is achieved by a progressive increase of the temperature during the displacement of the solid matter inside the turning tube, up to a maximum temperature of 330° C., with a residence time inside the oven being about 4 hours. After cooling the solid at reactive atmosphere and nitrogen purge, it is placed in contact with nitrogen diluted air so that its temperature remains below 45° C.

The activated catalyst thus obtained is designated below as catalyst A. It has a sulfur content of 10.2% by weight, which corresponds to a sulfuration stoichiometry of the metal sites of 95%.

Example 1 (as Per the Invention)

Catalyst A has been treated as follows:

3 kg of catalyst A has been placed in a stainless steel perforated drum with a volume of 18 liters (useful volume of 5 L) at a rotation speed of 20 rotations/minute, through which passes in full a hot air flow of 160 m³/hr at 90° C. to keep the catalyst bed at 70° C. during pulverization. The hot air flow takes place in parallel to the pulverization jet, and in the same direction (descending flow).

900 g of an EVOH polyethylene-polyvinyl alcohol copolymer solution (marketed under the name of EXCEVAL by the Kuraray company) at 5% by weight in water have been injected onto the catalyst particles by means of a two-fluid atomization nozzle with a solution flow rate of 7 g/min.

The water evaporates continuously which leads to the formation of a polymer layer or coating at the surface of the catalyst particles.

Following the full injection of the liquid, the catalyst is still stirred for 30 minutes at 70° C. to complete its drying, then cooled at ambient temperature.

In this way, catalyst B according to the invention has been obtained; the particles are covered with a continuous layer of polyethylene-polyvinyl alcohol copolymer for which the average thickness is 5 µm, as observed by scan electron microscopy.

Analysis of catalyst B shows that it contains 0.9% of carbon which corresponds to 1.5% by weight of polymer deposited on the catalyst with respect to initial catalyst A.

Example 2 (Comparative)

Catalyst A has been treated as follows:

3 kg of catalyst A have been placed in an unperforated stainless steel drum with a volume of 18 liters (useful volume of 5 L), at a rotation speed of 20 rotations/minute, and a hot air flow of 160 m³/hr at 95° C. is directed onto the surface of the catalyst bed to keep it at 55° C. during pulverization. The hot air enters through an inlet located inside the drum, and exits via the opening located in the front of the drum, without passing through the catalyst bed (leached bed), which explains that the heat exchange is not as good, and consequently the temperature is not as high inside the catalyst bed.

900 g of an EVOH polyethylene-polyvinyl alcohol copolymer solution (marketed under the name of EXCEVAL by the Kuraray company) at 5% by weight in water have been injected onto the catalyst particles by means of an atomization nozzle with a solution flow rate of 5 g/min.

The water evaporates continuously which leads to the formation of a polymer layer or coating at the surface of the catalyst particles.

Following the full injection of the liquid, the catalyst is still stirred for 30 minutes at 55° C. to complete its drying, then cooled at ambient temperature.

In this way catalyst C has been obtained, which is not in accordance with the invention, for which the particles are covered with a non-continuous layer of polyethylene-polyvinyl alcohol copolymer for which the average thickness is 6 µm as observed by scan electron microscopy, but which shows very considerable local thickness variations. In particular, we noticed the existence of points at the surface of the catalyst particles where the presence of a polymer layer was not detectable. At the points where a polymer layer is present, its thickness varies greatly, going from less than 0.1 µm to about 15 µm.

Analysis of catalyst C shows that it contains 0.8% by weight of carbon which corresponds to 1.4% by weight of polymer deposited on the catalyst with respect to initial catalyst A.

Example 3 (Comparative)

Catalyst A has been treated as follows:

3 kg of catalyst A have been placed in an unperforated stainless steel drum with a volume of 18 liters (useful volume of 5 L), at a rotation speed of 20 rotations/minute, and a hot air flow of 150 m$^3$/hr at 80° C. is directed onto the surface of the catalyst bed to keep it at 50° C. during pulverization. The hot air enters through an inlet located inside the drum, and exits via the opening located in the front of the drum, without passing through the catalyst bed (leached bed).

A solution of 750 g of polyacrylate resin at 20% by weight in ethyl acetate has been injected onto the catalyst particles using an atomization nozzle with a solution flow rate of 4 g/min.

The solvent evaporates continuously which leads to the formation of a polymer layer or coating at the surface of the catalyst particles.

Following the full injection of the liquid, the catalyst is still stirred for 15 minutes at 50° C. to complete its drying, then cooled at ambient temperature.

In this way, catalyst D was obtained, which is not in accordance with the invention, for which the particles are covered with a non-continuous layer of polyacrylate resin for which the average thickness is 20 μm as observed by scan electron microscopy, but which shows very considerable local thickness variations. In particular, we noticed the existence of points at the surface of the catalytic particles where the presence of a polymer layer was not detectable. At the points where a polymer layer is present, its thickness varies greatly, going from less than 0.1 μm to about 50 μm.

Analysis of catalyst D shows that it contains 3% by weight of carbon which corresponds to 5% by weight of polymer deposited on the catalyst with respect to initial catalyst A.

Example 4 (as Per the Invention)

Catalyst A has been treated as follows:

3 kg of catalyst A have been placed in a perforated stainless steel drum with a volume of 18 liters (useful volume of 5 L), at a rotation speed of 20 rotations/minute, with a hot air flow of 150 m$^3$/hr running fully through it at 55° C. to keep the catalyst bed at 45° C. during pulverization. The hot air flow takes place in parallel to the pulverization jet, and in the same direction (descending flow).

A solution of 750 g of polyacrylate resin at 20% by weight in ethyl acetate has been injected onto the catalyst particles using an atomization nozzle with a solution flow rate of 4 g/min.

The solvent evaporates continuously which leads to the formation of a polymer layer or coating at the surface of the catalyst particles.

Following the full injection of the liquid, the catalyst is still stirred for 30 minutes at 45° C. to complete its drying, then cooled at ambient temperature.

In this way, catalyst E as per the invention was obtained, for which the particles are covered with a continuous layer of polyacrylate resin for which the average thickness is 18 μm as observed by scan electron microscopy.

Analysis of catalyst E shows that it contains 3% by weight of carbon which corresponds to 5% by weight of polymer deposited on the catalyst with respect to initial catalyst A.

Example 5 (Comparative)

In this example, a comparative catalyst F has been prepared, by applying to activated catalyst A a process identical to the one described in example 1 above, by replacing the polymer aqueous solution by deionized water (not containing any polymer):

3 kg of catalyst A have been placed in a fully perforated stainless steel drum with a volume of 18 liters (useful volume of 5 L), at a rotation speed of 20 rotations/minute; a hot air flow of 160 m$^3$/hr at 90° C. passes fully through it to keep the catalyst bed at 70° C. during pulverization. The hot air flow takes place in parallel to the pulverization jet, and in the same direction (descending flow).

Then, 900 g of deionized water have been injected onto the catalyst particles using a two-fluid atomization nozzle with a flow rate of 7 g/min.

The water evaporates continuously. Following the full injection of the liquid, the catalyst is still stirred for 30 minutes at 70° C. to complete its drying, then cooled at ambient temperature.

Consequently, comparative catalyst F has been obtained.

Analysis of catalyst F shows that it contains at least 0.1% by weight of carbon.

Example 6 (Comparative)

In this example, a comparative catalyst F' has been prepared by applying to activated catalyst A a process similar to the one described in example 5 above:

3 kg of catalyst A have been placed in a fully perforated stainless steel drum with a volume of 18 liters (useful volume of 5 L), at a rotation speed of 20 rotations/minute, a hot air flow of 160 m$^3$/hr at 130° C. passes fully through it to keep the catalyst bed at 100° C. during pulverization. The hot air flow takes place in parallel to the pulverization jet, and in the same direction (descending flow).

Then, 900 g of deionized water have been injected onto the catalyst particles using a two-fluid atomization nozzle with a flow rate of 7 g/min.

The water evaporates continuously. Following the total injection of the liquid, the catalyst is still stirred for 30 minutes at 100° C. to complete its drying, then cooled at ambient temperature.

Consequently comparative catalyst F' has been obtained.

Analysis of catalyst F' shows that it contains at least 0.1% by weight of carbon.

Example 7 (Comparative)

In this example, a comparative catalyst G has been prepared by treating catalyst A as follows:

1 kg of catalyst A has been placed in an unperforated stainless steel drum with a volume of 3 liters at a rotation speed of 12 rotations/minute, at a temperature of 120° C. under a nitrogen atmosphere.

Then, 200 g of mineral oil (marketed under the name of Lube Oil 600 Neutral by Total, with a viscosity at 40° C. of 120 cP) have been pulverized onto the catalyst, with a flow rate of 6 g/min.

Following full injection of the oil, the catalyst is cooled at ambient temperature.

In this way comparative catalyst G was obtained.

Example 8

Characterization of the Obtained Catalysts

The properties of catalysts A to G described in examples 1 to 7 above have been assessed, by determining the following parameters for each:

Critical Self Heating Temperature—CSHT:

This parameter characterizes the self heating properties of the activated catalyst, using a procedure similar to the UN standard (test described in the "Recommendation on the transport of dangerous goods. Manual for Tests and Criteria", ISSN 1014-7160, Section 33.3 document). This CSHT test can be conducted according to two variants, for which only the volume of the sample varies. The test procedure is as follows:

Catalyst samples have been placed in a cubic metal grill box, which lets air pass through. A thermocouple is placed in the sample, and the box is placed in an oven equipped with thermostat.

If the temperature of the catalyst is not higher by more than 60° C. over that of the oven for a 24 hr period, the test is repeated with a new sample of the same catalyst and by increasing the oven temperature by 10° C.

This determines temperature T1 which corresponds to the highest oven temperature attained, for which the catalyst temperature is not higher than T1+60° C.

The critical Self Heating Temperature—CSHT is defined as follows:

$$CSHT(° C.) = T1(° C.) + 5° C.$$

For the first variant of the test, the cubic box has a volume of 1 L and the temperature thus obtained was referred to as CSHT-1 L. For the second variant of the test, the cubic box has a volume of 15 mL and the temperature thus obtained was referred to as CSHT-15 ml.

Hydrosulfuration Activity:

Hydrosulfuration activity of each catalyst has been determined in a pilot unit.

The feedstock used is a "straight run" diesel fuel which has the following characteristics:

| | |
|---|---|
| Sulfur content (ppm by weight) | 11600 |
| Nitrogen content (ppm by weight) | 199 |
| Density (g/mL) | 0.859 |

For each sample, the catalyst volume used for the test is 10 mL.

When starting the hydrodesulfuration test, the diesel fuel feedstock is injected with a $VVH=3\ h^{-1}$ and the reactor is placed under hydrogen pressure ($30 \cdot 10^5$ Pa), then the temperature is increased by 0.5° C./min up to 320° C. The 320° C. level is held for 5 hrs before proceeding with the test conditions. This standard startup stage for an activated catalyst is sufficient to deprotect the catalyst grains.

The test feedstock is then injected to start the actual test. The test conditions were as follows: pressure of 4 MPa (40 bars), $H_2$/gazole (diesel fuel) ratio of 300, $VVH=2\ h^{-1}$, temperature of 357 to 367° C., test duration of 6 days.

The sulfur content of the feedstock is measured at the outlet of the unit by means of a UV fluorescence analyser. The apparent constants of the desulfuration reaction have been calculated according to the E1 formula below:

$$K_v = \left(\frac{1}{\alpha-1}\right)\left(\frac{1}{S^{\alpha-1}} - \frac{1}{S_0^{\alpha-1}}\right) * VVH \quad (E1)$$

where
$K_v$=apparent reaction constant
=order of the reaction (considered equal to 1.2)
S=sulfur content of the effluents
$S_0$=sulfur content of the feedstock
VVH=hourly volume speed of the liquid feedstock The performances of each sample have been assessed with respect to that of a reference catalyst. For that, the Relative Volume Activity (RVA) has been calculated according to the E2 formula that follows:

$$RVA = \frac{Kv(\text{sample})}{Kv(\text{reference})} \times 100 \quad (E2)$$

As reference, the value $K_v$ of 100 has been assigned to activated catalyst A.

The Low Temperature $SO_2$ Emissions:

A 25 g catalyst sample is weighed then placed in a 1 L container with air that is then sealed using a plug equipped with a septum. The container is then placed in a heat chamber with thermostat at 50° C. for 24 hrs. After 24 hrs, the container is removed and left to cool at ambient temperature. Then a $SO_2$ analysis is made for the gas contained in the container, by sampling through the septum using a syringe. The gas analysis gives immediately the ppm result of $SO_2$ emitted by the catalyst.

For each catalyst, immediately after its preparation the two critical self heating temperatures (CSHT-1 L and CSHT-15 mL), the RVA activity and the $SO_2$ formation were determined.

The results obtained for each catalyst are put together in Table 1 below:

TABLE 1

| Catalyst | Protective layer | Equipment | CSHT 1 L | CSHT 15 mL | Activity RVA | Emissions $SO_2$ |
|---|---|---|---|---|---|---|
| A (initial catalyst) | | | 65° C. | 115° C. | 100 | 150 ppm |
| B (invention) | EVOH | Perforated drum | 125° C. | >220° C. | 98 | 0.2 ppm |
| C (comparative) | EVOH | Unperforated drum | 85° C. | 155° C. | 99 | 15 ppm |
| D (comparative) | Polyacrylate | Unperforated drum | 85° C. | 145° C. | 84 | 50 ppm |
| E (invention) | Polyacrylate | Perforated drum | 105° C. | 205° C. | 88 | 4 ppm |
| F (comparative) | — | Perforated drum | 65° C. | 115° C. | 101 | 150 ppm |
| F' (comparative) | — | Perforated drum | 85° C. | 145° C. | 98 | 460 ppm |
| G (comparative) | Oil | Unperforated drum | 85° C. | 145° C. | 98 | 120 ppm |

The results above show that activated catalyst A has a low critical self heating temperature (65° C.), typical for this type of catalyst at the newly activated state, then air-stabilized.

Protection provided with a layer of film forming polymer (catalyst B and catalyst E as per the invention), obtained with the process according to the invention, enables to reduce in a particularly efficient way the self heating of the activated catalyst A: the critical self heating temperature for box 1 L is increased considerably, since it is 125° C. for catalyst B and 105° C. for catalyst E.

In addition, these two catalysts show an $SO_2$ emission well below initial catalyst A, and below the 5 ppm threshold.

In comparison, catalysts C and D which are not in accordance with the invention, for which the protection has been done in an unperforated drum, for which the air flow does not pass through the catalyst grains, have a self heating feature that is quite higher, with CSHT-1 L temperatures of 85° C. In addition, the $SO_2$ emission remains high in both cases (15 and 50 ppm). Consequently, these two examples show the importance of conducting the process according to the invention by having an air flow circulate through the catalyst particles during pulverization of the composition containing the film forming polymer.

Catalysts F and F' correspond to "blank" tests, that permit to verify easily the impact of the coating conditions themselves (pulverization of water and hot air flow) on the properties of the catalyst. The self heating properties of these two catalysts, for which the respective CSHT-1 L are 65 and 85° C., are coherent with the passivation methods by the active phase oxidation, already known by the prior state of the art. The $SO_2$ emissions are greatly increased for catalyst F' which can be explained by the relatively high oxidative stabilization of the active phase, when catalyst A has been placed at 100° C. under an air flow.

The use of mineral oil as protective material also leads to a moderate increase of the critical self heating temperature and a small reduction of the $SO_2$ emissions, at values that remain low in comparison with those reached for catalysts B and E according to the invention using film forming polymers.

The invention claimed is:

1. A process for limiting self-heating of activated catalyst particles, comprising:
    placing activated catalyst particles in motion in a perforated drum within a hot gas flow passing continuously through the perforated drum, wherein the gas has a temperature greater than 25° C.; and
    spraying onto the particles in motion a liquid composition comprising a solution or a dispersion of one or more film-forming polymer(s) in a solvent, wherein the composition contains 0.5% to 50% by weight of film-forming polymer(s) with respect of the total weight of the composition, wherein, upon evaporation of the solvent from the composition, a protective layer containing said film-forming polymer(s) is formed on the surface of the particles, and wherein the protective layer has an average thickness less than or equal to 20 µm:
thereby limiting self-heat of the activated catalyst particles.

2. The process according to claim 1, wherein the process further results in reducing emission by the activated catalyst particles of toxic gas.

3. The process according to claim 1, wherein the hot gas flow passing through the catalyst particles has a temperature within a range of between 30° C. and 150° C.

4. The process according to claim 1, wherein the gas flow rate within a range of between 5 and 100 $m^3$ per hour and per kilogram of catalyst.

5. The process according to claim 1, wherein the one or more film-forming polymer(s) forming the protective layer comprises from 50% to 100% by weight of the protective layer.

6. The process according to claim 1, wherein the film-forming polymer(s) is(are) selected from the group consisting of:
    vinyl alcohol homo- and copolymers;
    partially hydrolyzed vinyl alcohol homo-and copolymers, containing non-hydrolyzed vinyl acetate units;
    polyethylene glycols;
    collagen;
    polyethylene terephalates (PET);
    polyethylene naphthalates (PEN);
    polyamides;
    polysaccharides;
    polyvinyl chlorides (PVC);
    polyvinylidene chlorides (PVDC);
    polyacrylonitriles (PAN);
    polyacrylate resins;
    copolymers of which at least one of the monomers is of the acrylate type;
    and mixtures thereof.

7. The process according to claim 6, wherein the vinyl alcohol homo- and copolymers are selected from the group consisting of polyvinyl alcohols and copolymers made up of vinyl alcohol and olefin(s) monomers.

8. The process according to claim 1, wherein the average thickness of the protective layer is less than or equal to 10 µm.

9. The process according to claim 1, wherein the total amount of film-forming polymer used is within a range of between 0.1% and 6% by weight with respect to the total weight of the activated catalyst particles.

10. The process according to claim 1, wherein formation of the protective layer reduces the quantity of toxic gases emitted by the activated catalysts as compared to activated catalysts lacking the protective layer containing said film-forming polymer(s) on the surface of the particles.

11. The process according to claim 7, wherein the copolymers made up of vinyl alcohol and olefin(s) monomers are selected from the group consisting of copolymers made up of ethylene and vinyl alcohol monomers (EVOH copolymers).

12. The process according to claim 1, wherein the average thickness of the protective layer is within a range of between 0.2 µm and 10 µm.

13. The process according to claim 1, wherein the average thickness of the protective layer is within a range of between 0.5 µm and 8 µm.

14. The process according to claim 1, wherein the total amount of film-forming polymer used is within a range of between 0.5% and 4% by weight with respect to the total weight of the activated catalyst particles.

15. The process according to claim 1, wherein the total amount of film-forming polymer used is within a range of between 1% and 3% by weight with respect to the total weight of the activated catalyst particles.

16. The process according to claim 5, wherein the one or more film-forming polymer(s) forming the protective layer comprises 100% by weight of the protective layer.

17. The process according to claim 1, wherein the gas flow is an air flow.

18. The process according to claim 1, wherein a continuous protective layer is formed on the surface of the particles.

* * * * *